Inventor
George C. Thoman

By C. C. Shepherd,
Attorney

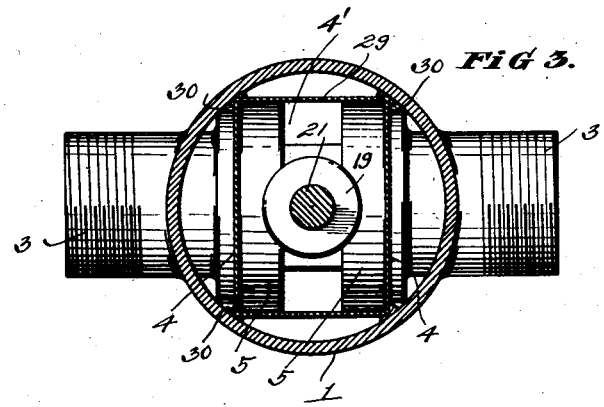
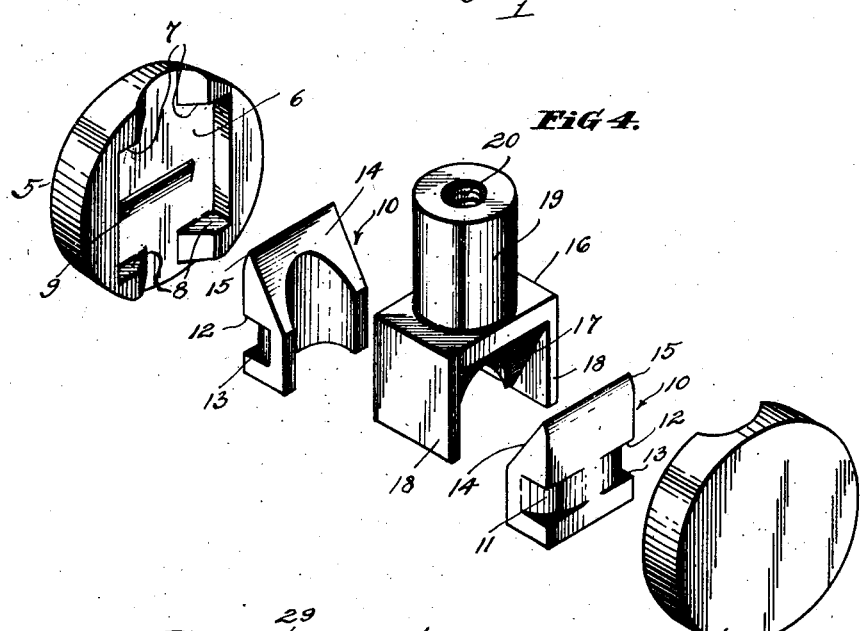
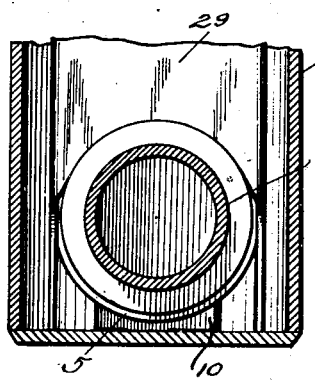

Patented Nov. 29, 1927.

1,650,969

UNITED STATES PATENT OFFICE.

GEORGE C. THOMAN, OF COLUMBUS, OHIO.

GATE VALVE.

Application filed October 3, 1923. Serial No. 666,244.

The present invention is directed to improvements in gate valves.

The primary object of the invention is to provide a valve of this nature particularly adapted to be used in connection with high pressure fluids, such as oil gas or the like.

Ordinarily valves of this kind are formed mainly from cast iron and are connected in pipe lines of different materials, which being the case, the threaded connections under varying changes of temperature expand and contract with the result that the threaded connections become loose and leaky connections result. I overcome this defect by making the valve casing and inlet and outlet pipes for the casing of the same material as the material from which the pipe line is made so that each part will expand and contract to the same degree, thereby eliminating any possibility of leaks at the connections.

With these and other objects in view, as will appear as the description proceeds, the invention consists in the novel features of construction, combinations of elements and arrangements of parts, and hereinafter to be fully described and pointed out in the appended claims.

Figure 1:
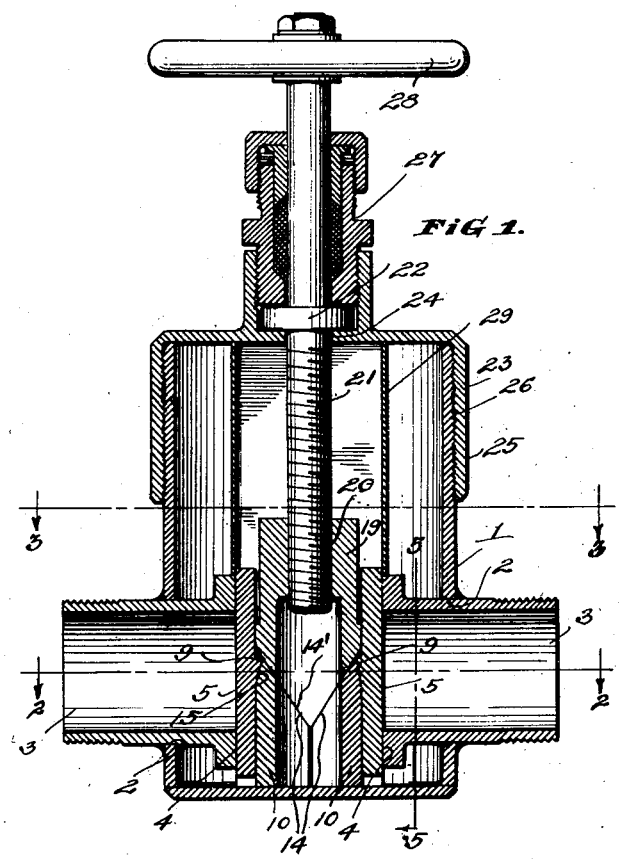
Figure 2:
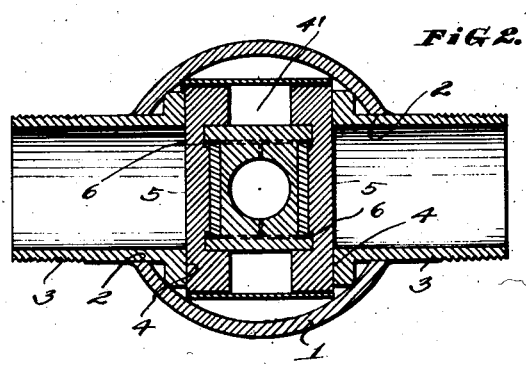

In the accompanying drawing:
Figure 1 is a vertical central sectional view through the valve, Figure 2 is a sectional view on line 2—2 of Figure 1, Figure 3 is a sectional view on line 3—3 of Figure 1, Figure 4 is a view of the valve nonassembled, and Figure 5 is a sectional view on line 5—5 of Figure 1.

Referring to the drawings 1 designates the casing which is formed from a section of wrought-iron pipe so as to withstand high pressures and at the same time lighten the valve, said casing having diametrically opposed openings 2 formed in the wall thereof and adjacent the lower end thereof and in which are engaged the inlet and outlet pipes 3—3 which are formed of the same material as the casing 1, said pipes being welded in the respective openings and have their confronting ends provided with annular flanges which constitute valve seats 4, there being a valve chamber 4' formed between said seats.

The valve includes valve disks 5 adapted to seat upon the seats 4, the inner faces of said disks being formed with recesses 6 and upper and lower spaced shoulders 7 and 8, respectively. The bases of said recesses are provided with transversely disposed centrally located beveled ribs 9, the purpose of which will appear later.

A pair of spreading members 10—10 are employed and have formed in their outer sides transverse grooves 11 and resultant upper and lower stops 12 and 13, respectively, said stops cooperating with the shoulders 8 to limit the vertical sliding movement of the spreading members with respect to the valve disks 5. The spreading members also have their inner faces provided with tapered faces 14 which when confronting form a substantially V shaped socket 14', said spreading members also having their upper ends beveled as at 15 which are adapted to cooperate with the beveled ribs 9 in a manner to be hereinafter described.

The head 16 is formed with a wedge shaped portion 17, the ends of which are confined by guides 18 for receiving the spreading members 10 to prevent lateral movement thereof but allowing the same to slide freely. This head includes a shank 19 in which is formed an axial threaded opening 20, in which is threaded the lower end of the valve stem 21, said stem being formed intermediate its ends with an annular shoulder 22 which rests upon the top of the cap 23 which is provided with an opening 24 in which said stem is engaged. This shoulder prevents vertical movement of the stem 21 but permits the same to be freely rotated. The cap has its flange 25 threaded upon the casing 1, as at 26 whereby said cap can be conveniently removed or replaced, said flange being comparatively deep so as to eliminate the use of packing.

The upper portion of the stem 21 is provided with a gland structure 27 and has secured upon its extreme upper end a hand wheel 28 through the medium of which said stem can be conveniently rotated.

Located in the casing 1 is a sheet metal vertically disposed boxing 29, rectangular in cross-section, said boxing being held firmly in place by welding the same at its corners to the interior surface of the casing 1, as at 30. The upper end of the boxing 29 is in a plane with the upper edge of the casing 1 so that when the cap 23 is secured upon the casing it will lie flush against the upper end of said boxing. It will be observed that when the valve is raised or lowered that the disk 5 thereof will slide upon the sides of the boxing and be guided thereby.

It will be obvious that upon rotating the stem 21 in one direction that the head 16 will be fed downwardly, whereupon the lower ends of the spreading members 10 will engage the bottom of the casing 1 and upon continued rotation of the stem the tapered faces 14 will ride upon the wedge shaped portion 17, thereby forcing the disks 5 into tight engagement with the seats 4. Owing to the presence of the ribs 9 and beveled ends 15 pressure will be exerted upon the central portions of the disks 5 so that any tendency to tilt will be overcome.

To open the valve it is only necessary to reverse the rotation of the stem and as the head 16 is moved upwardly, the shoulders 7 of the disks will interlock therewith and the entire valve will be raised to the desired height to permit passage of fluid through the pipe sections 3—3.

By providing the V shaped socket 14' the wedge shaped portion 17 will readily enter between the spreading members 10 as will be obvious.

What is claimed is:

1. A valve of the character described comprising a casing, having a valve chamber therein, inlet and outlet pipe sections secured in the casing and having seats disposed in spaced relation within the valve chamber, a valve including a pair of discs adapted to engage said seats, each of said discs having vertically spaced shoulders on their inner faces, spreader members having recesses in their outer faces to receive the lowermost shoulders of the discs, and a head adapted to be engaged with the spreader members for lowering the discs and forcing the same into engagement with the seats and engaged with the uppermost shoulder of the discs for raising said discs, said head having end portions adapted to overlie the ends of the spreader members.

2. A valve of the character described comprising a casing having a valve chamber therein, inlet and outlet pipe sections secured in the casing and having seats disposed in spaced relation within the valve chamber, a valve including a pair of discs adapted to engage said seats, each of said discs having vertically spaced shoulders on their inner faces and a transversely extending rib intermediate the shoulders, spreader members having recesses in their outer faces to receive the lowermost shoulder of the discs, and a head adapted to be engaged with the spreader members for raising and lowering the discs and forcing the same into engagement with the seats and engaged with the uppermost shoulders for raising the discs, said head engaging the transversely extending ribs to prevent tilting of the discs.

In testimony whereof I affix my signature.

GEORGE C. THOMAN.